United States Patent
Utagawa

(10) Patent No.: US 10,501,081 B2
(45) Date of Patent: Dec. 10, 2019

(54) VEHICULAR CONTROL DEVICE, METHOD OF CONTROLLING VEHICULAR CONTROL DEVICE, AND VEHICULAR CONTROL SYSTEM

(71) Applicant: HITACHI AUTOMOTIVE SYSTEMS, LTD., Hitachinaka-shi, Ibaraki (JP)

(72) Inventor: Yoshiyuki Utagawa, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 271 days.

(21) Appl. No.: 15/557,279

(22) PCT Filed: Feb. 19, 2016

(86) PCT No.: PCT/JP2016/054888
§ 371 (c)(1),
(2) Date: Sep. 11, 2017

(87) PCT Pub. No.: WO2016/147794
PCT Pub. Date: Sep. 22, 2016

(65) Prior Publication Data
US 2018/0057008 A1  Mar. 1, 2018

(30) Foreign Application Priority Data
Mar. 17, 2015 (JP) .................. 2015-053628

(51) Int. Cl.
*G07C 5/08* (2006.01)
*B60W 30/18* (2012.01)
(Continued)

(52) U.S. Cl.
CPC ... *B60W 30/18109* (2013.01); *B60R 16/0231* (2013.01); *B60T 7/12* (2013.01);
(Continued)

(58) Field of Classification Search
CPC .................................................. G07C 5/0808
See application file for complete search history.

(56) References Cited

U.S. PATENT DOCUMENTS 5,633,537 A * 5/1997 Kurata ............... B60R 16/0315
307/10.1
RE38,338 E * 12/2003 Yoshida ............. B60R 16/0315
307/10.2
(Continued)

FOREIGN PATENT DOCUMENTS

JP      H01-127990 A    5/1989
JP         4147253 B2   9/2008
(Continued)

*Primary Examiner* — Sherry L Estremsky
(74) *Attorney, Agent, or Firm* — Foley & Lardner LLP

(57) ABSTRACT

A vehicular control device includes a control unit that controls an electrical component, a wake-up circuit that wakes up the control unit on the basis of a wake-up signal from a switch for operating the electrical component, and a wake-up stop circuit that interrupts the wake-up signal supplied from the switch to the wake-up circuit after a predetermined length of time has elapsed from a wake-up instruction. The vehicular control device is put to sleep by forcibly interrupting the wake-up signal in the wake-up stop circuit, regardless of the state of the switch after the predetermined length of time has elapsed from the wake-up instruction, and thus it is possible to prevent a wake-up state from being maintained even in a case where the switch is fixed in an on-state.

15 Claims, 6 Drawing Sheets

(51) Int. Cl.
  *B60T 8/00* (2006.01)
  *B60R 16/023* (2006.01)
  *B60T 7/12* (2006.01)
  *H04L 12/40* (2006.01)
  *B60T 13/74* (2006.01)
  *F16D 55/226* (2006.01)
  *F16D 65/18* (2006.01)
  *F16D 121/24* (2012.01)

(52) U.S. Cl.
  CPC .............. *B60T 8/00* (2013.01); *B60T 13/741* (2013.01); *G07C 5/0808* (2013.01); *H04L 12/40* (2013.01); *F16D 55/226* (2013.01); *F16D 65/183* (2013.01); *F16D 2121/24* (2013.01)

(56) References Cited

U.S. PATENT DOCUMENTS

| | | | | |
|---|---|---|---|---|
| 7,206,952 B2* | 4/2007 | Wilsser | ................ | H01H 19/585 |
| | | | | 200/237 |
| 9,390,569 B2* | 7/2016 | Kurnik | ................... | G07C 5/085 |
| 2018/0075674 A1* | 3/2018 | Utagawa | ................... | B60T 8/00 |

FOREIGN PATENT DOCUMENTS

| | | |
|---|---|---|
| JP | 2009-296280 A | 12/2009 |
| JP | 2010-254258 A | 11/2010 |
| JP | 2012-035722 A | 2/2012 |

* cited by examiner

VEHICULAR CONTROL DEVICE, METHOD OF CONTROLLING VEHICULAR CONTROL DEVICE, AND VEHICULAR CONTROL SYSTEM

TECHNICAL FIELD

The present invention relates to a vehicular control device that controls an electrical component, a method of controlling a vehicular control device, and a vehicular control system to which a vehicular control device is connected through an in-vehicle network such as a controller area network (CAN).

BACKGROUND ART

Electrical components which are controlled by an electronic control unit (ECU) mounted in a vehicle are of great variety, and are controlled in various ways. For example, Patent Document 1 discloses an electric parking brake device which is controlled by an ECU. In Patent Document 1, a parking brake interlocked with a throttle operation and a shift operation is prohibited from being automatically released while an ignition power supply is on and an engine is stopped, and thus an erroneous operation is suppressed, which leads to an improvement in safety.

REFERENCE DOCUMENT LIST

Patent Document

Patent Document 1: Japanese Patent No. 4147253

SUMMARY OF THE INVENTION

Problems to be Solved by the Invention

In recent years, more and more vehicles have been equipped with electrical components, and the number of ECUs mounted per vehicle has increased. In a vehicular control device having a large number of ECUs mounted therein, a dark current when an ignition is off increases, and thus there is a strong request for a reduction in the dark current.

However, in the above-described electric parking brake, in a case where an operation switch is fixed in an on-state (called on-state fixation), a wake-up signal is fixed at a high level, and thus there is a concern that an ECU for the electric parking brake cannot be set in an operation stop (sleep) state.

For this reason, even when the ignition is off, CAN communication between the ECU and ECUs for other electrical components is performed, and the ECUs for other electrical components having a CAN wake-up function keep operating, to thereby increase consumption current. In a case where the on-state fixation of the operation switch lasts for a long time, a battery is exhausted.

Such a problem does not occur only in the electric parking brake, but also occurs in a case where a switch for operating an electrical component is fixed in an on-state, in a vehicular control system including a plurality of ECUs connected to each other through an in-vehicle network.

The present invention is contrived in view of such circumstances, and an object thereof is to provide a vehicular control device capable of reducing a dark current when an ignition is off in a case where a switch for operating an electrical component is fixed in an on-state, a method of controlling a vehicular control device, and a vehicular control system.

Means for Solving the Problems

According to the present invention, there is provided a vehicular control device comprising: a control unit that controls an electrical component; a wake-up circuit that wakes up the control unit on the basis of a wake-up signal from a switch for operating the electrical component; and a wake-up stop circuit that interrupts the wake-up signal supplied from the switch to the wake-up circuit after a predetermined length of time has elapsed from a wake-up instruction.

In addition, according to the present invention, there is provided a method of controlling a vehicular control device including a control unit that controls an electrical component, a wake-up circuit that wakes up the control unit on the basis of a wake-up signal from a switch for operating the electrical component, and a wake-up stop circuit that interrupts the wake-up signal supplied from the switch to the wake-up circuit after a predetermined length of time has elapsed from a wake-up instruction, the method comprising: diagnosing whether the switch for operating the electrical component in the control unit is fixed in an on-state; performing an on/off determination of an ignition key when the switch is diagnosed to be fixed in an on-state; performing failure recording in a case where the ignition key is determined to be off; and stopping self-maintenance to put the control unit to sleep so as to stop its operation.

Further, according to the present invention, there is provided a vehicular control system in which a plurality of control devices that control a plurality of electrical components, respectively, are connected to each other through an in-vehicle network, wherein at least one of the plurality of control devices is woken up in response to a switch for operating an electrical component, and stops wake-up regardless of a state of the switch after a predetermined length of time has elapsed.

Effects of the Invention

According to the present invention, the wake-up stop circuit interrupts the wake-up signal after a predetermined length of time has elapsed from a wake-up instruction, and thus can forcibly stop a wake-up state even in a case where the switch is fixed in an on-state. Therefore, there is no fear either that the wake-up state is maintained even in a case where the switch for operating an electrical component is fixed in an on-state, and thus it is possible to reduce a dark current when an ignition is off.

In addition, in the vehicular control system having a plurality of control devices, inclusive of this vehicular control device, connected to each other through an in-vehicle network, a case also does not occur in which communication between the vehicular control device having the switch for operating an electrical component fixed in an on-state and vehicular control devices for other electrical components is performed, and the vehicular control devices for other electrical components having a wake-up function are set to be in an operation continuation state, to thereby increase consumption current. Thus, it is also possible to prevent a battery from being exhausted due to the continuous on-state fixation of the switch for operating an electrical component.

MODE FOR CARRYING OUT THE INVENTION

Hereinafter, an embodiment of the present invention will be described with reference to the accompanying drawings.

Figure 1:
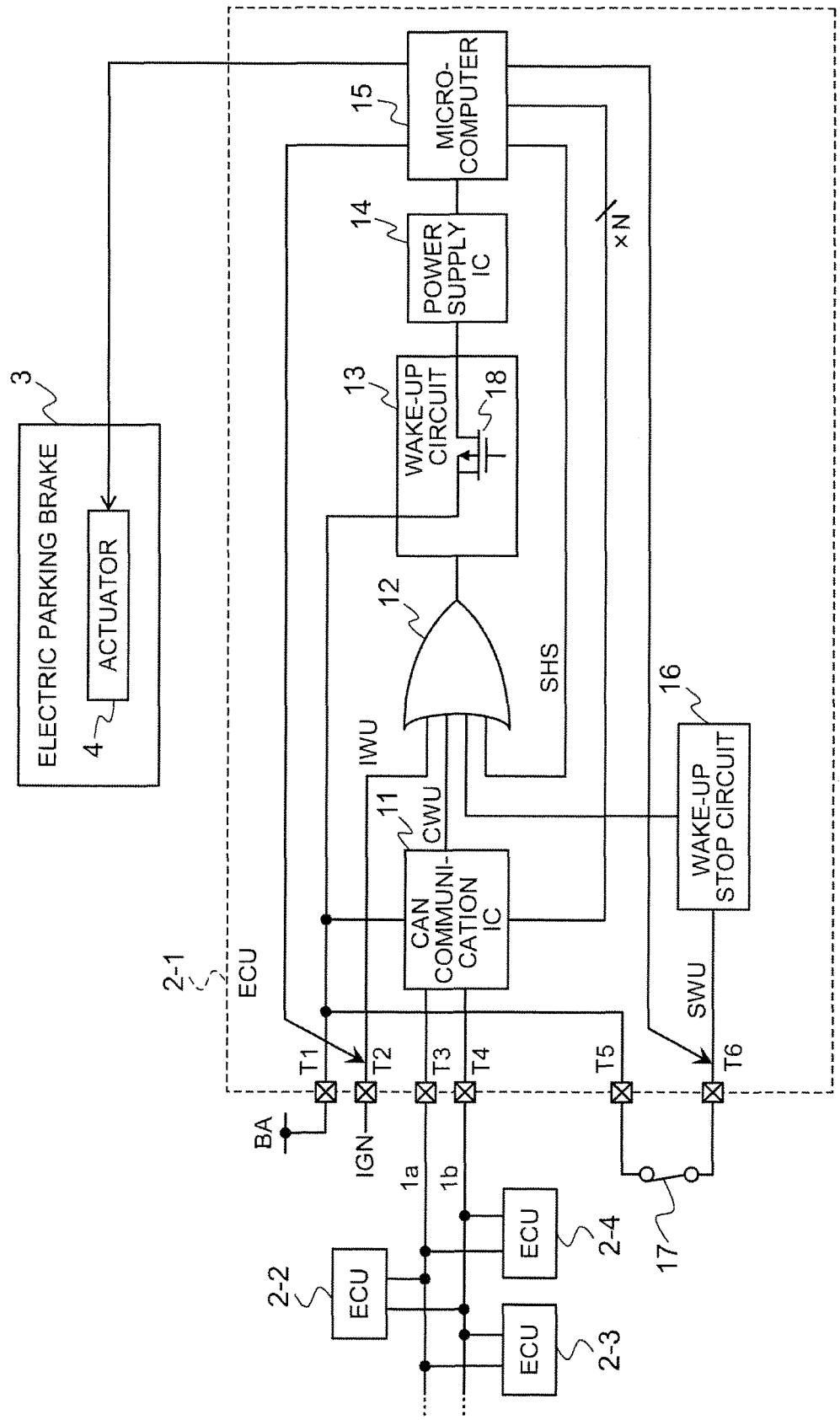
FIG. 1 is a schematic configuration diagram of a vehicular control device and a vehicular control system according to an embodiment of the present invention.

FIG. 1 is a schematic configuration diagram of a vehicular control device and a vehicular control system. FIG. 1 illustrates an electric parking brake as an example of an electrical component to be controlled. In FIG. 1, a control device that controls the electric parking brake and a vehicular control system constituted by a plurality of control devices connected to this control device through an in-vehicle network.

This system includes a plurality of ECUs (control devices) 2-1, 2-2, 2-3, 2-4, . . . connected to each other through CAN buses 1a and 1b for an in-vehicle network. ECU 2-1 is used for an electric parking brake 3, and controls the driving of an actuator 4 that performs the application and release of electric parking brake 3. ECUs 2-2, 2-3, 2-4, . . . control other electrical components, for example, devices such as an engine management system, a power train system, a traveling control system and an in-vehicle information system or various sensors, while one or more of them are mutually cooperating or interlocking.

ECU 2-1 includes a CAN communication integrated circuit (IC) 11, an OR gate 12, a wake-up circuit 13, a power supply IC 14, a microcomputer 15, a wake-up stop circuit 16, a switch (external switch) 17 for operating electric parking brake 3, and the like. ECU 2-1 is provided with a power supply terminal T1, an IGN terminal T2, CAN_H and CAN_L terminals T3 and T4, switch terminals T5 and T6, and the like. Power supply terminal T1 is supplied with power from a battery BA. A signal IGN indicating the state of an ignition key (ignition switch) is input to IGN terminal T2. CAN_H and CAN_L terminals T3 and T4 are connected to CAN buses 1a and 1b, respectively. Operation switch 17 is connected between switch terminals T5 and T6.

CAN communication IC 11 is supplied with power from power supply terminal T1. CAN communication IC 11 performs data communication based on a CAN protocol from CAN_H and CAN_L terminals T3 and T4 through CAN buses 1a and 1b by control of microcomputer 15. Microcomputer 15 functions as a control unit that controls an electrical component (actuator 4 of electric parking brake 3 in the present example), and controls reception, transmission, state setting or the like based on CAN communication IC 11. A CAN wake-up signal CWU is output from CAN communication IC 11 to OR gate 12. Examples of signals which are input to OR gate 12 include a signal IWU indicating the state of the ignition key from IGN terminal T2, a wake-up signal SWU according to an on/off-state from operation switch 17, a self-maintenance signal SHS from microcomputer 15, and the like.

Wake-up circuit 13 wakes up microcomputer 15 in a sleep state on the basis of a logical product signal which is output from OR gate 12. When an instruction for wake-up is given, wake-up circuit 13 is configured to supply power from power supply terminal T1 to power supply IC 14, and supply power from power supply IC 14 to microcomputer 15. Wake-up circuit 13 is constituted by, for example, a semiconductor switch element as illustrated in the drawing as a P-channel type MOSFET 18. The current passage of MOSFET 18 is connected between power supply terminal T1 and power supply IC 14. Wake-up stop circuit 16 functions as a trigger circuit that starts clocking using the on-operation of operation switch 17 as a trigger, and outputs wake-up signal SWU which is at a high level for a predetermined length of time from the trigger. Thus, even in a case where operation switch 17 is fixed in an on-state, ECU 2-1 is forcibly stopped (sleep) after a predetermined length of time has elapsed from a wake-up instruction.

Microcomputer 15 monitors signal IGN indicating the state of the ignition key which is input from IGN terminal T2, and monitors wake-up signal SWU which is input from switch terminal T6. Operation switch 17 is connected between switch terminals T5 and T6. Switch terminal T5 is connected to power supply terminal T1 through a wiring within ECU 2-1, and switch terminal T6 is connected to one input terminal of OR gate 12 through wake-up stop circuit 16. When operation switch 17 enters an on-state in a sleep state, OR gate 12 is supplied with wake-up signal SWU of a high level. Wake-up signal SWU is interrupted by wake-up stop circuit 16 after a predetermined length of time has elapsed from a wake-up instruction.

Here, operation switch 17 is connected to power supply terminal T1 through the wiring within ECU 2-1, but may be connected directly to a power supply line on the vehicle side.

When wake-up signal SWU of a high level is input to OR gate 12, microcomputer 15 operates by power supplied from wake-up circuit 13 through power supply IC 14 and microcomputer 15 monitors the state of operation switch 17. In a case where operation switch 17 gives an instruction to apply the electric parking brake, microcomputer 15 sets electric parking brake 3 to an applied state by driving actuator 4 through a drive circuit or the like (not shown). Microcomputer 15 further outputs self-maintenance signal SHS of a high level to OR gate 12 and holds the operating state of ECU 2-1.

In a case where operation switch 17 gives an instruction to release the electric parking brake in a state where electric parking brake 3 is applied and in a state where the ignition key is on, or in a case where it is detected that, for example, an engine is started up and a shift operation or an accelerator operation after that is performed, microcomputer 15 releases electric parking brake 3 by driving actuator 4 through a drive circuit or the like (not shown).

Figure 2A:
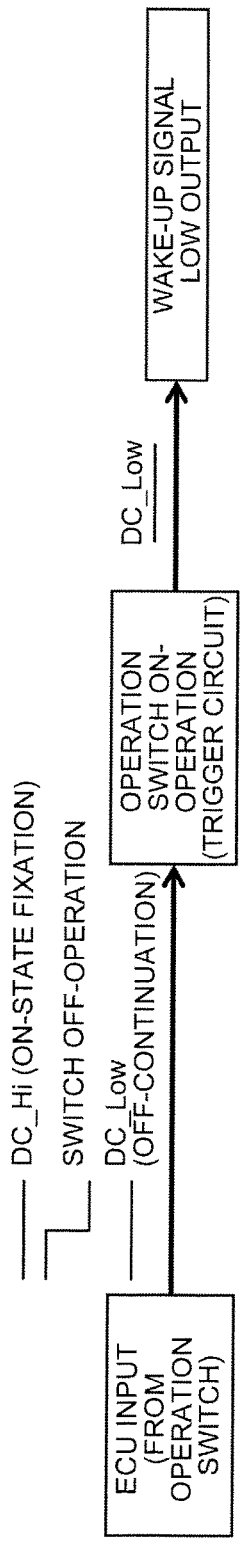
FIGS. 2A to 2C are schematic diagrams illustrating a relationship between the state of an operation switch and the operation of a wake-up stop circuit in the vehicular control device illustrated in FIG. 1.
Figure 2B:
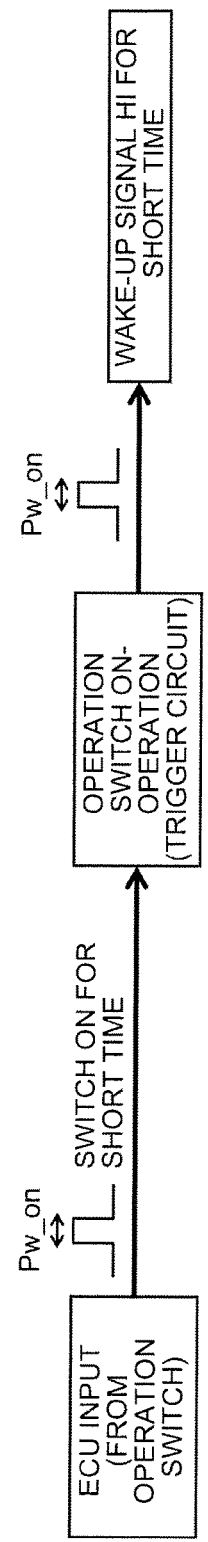
Figure 2C:
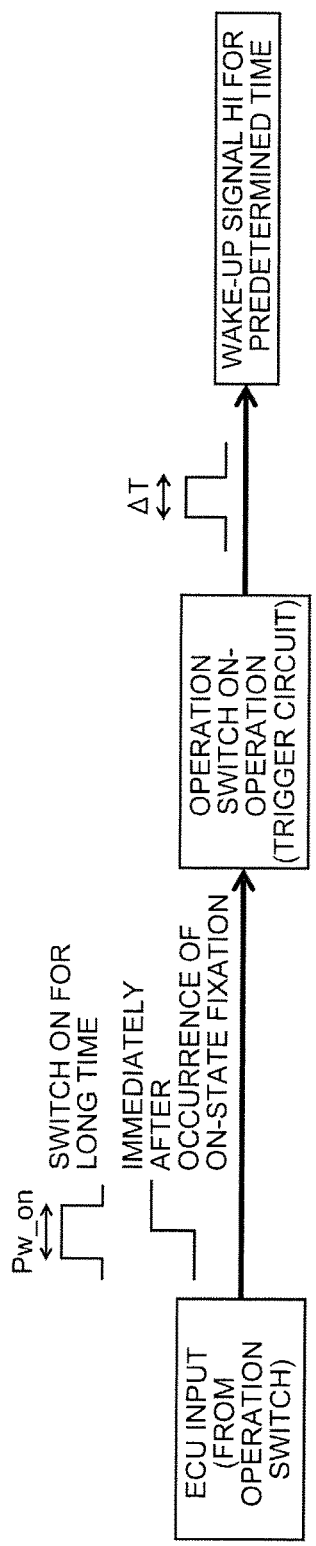

FIGS. 2A to 2C illustrates a relationship between the state of operation switch 17 and the operation of wake-up stop circuit 16 in the above-described vehicular control device. In the present example, the stop of a wake-up function is realized using a one-shot pulse signal.

FIG. 2A is a case where input (wake-up signal SWU) from operation switch 17 to ECU 2-1 is at a direct-current high level (DC_Hi), in a high-impedance state in a state where operation switch 17 is off, and in the steady state of a direct-current low level (DC_Low). At this time, wake-up signal SWU is set to be at a direct-current low level (DC_Low).

FIG. 2B is a case where operation switch 17 is on for a short length of time (pulse width Pw_on of wake-up signal SWU is shorter than a predetermined length of time ΔT "Pw_on<ΔT"). At this time, operation switch 17 is set on, and thus pulsed wake-up signal SWU which is at a high level only for a short length of time Pw_on is output from wake-up stop circuit (trigger circuit) 16.

FIG. 2C is a case where operation switch 17 is on for a long length of time (pulse width Pw_on of wake-up signal SWU is longer than the predetermined length of time ΔT "Pw_on>ΔT"), or a case where on-state fixation has occurred. At this time, operation switch 17 is set on, and thus pulsed wake-up signal SWU which is at a high level only for the predetermined length of time ΔT is output from the trigger circuit.

As described above, a circuit is provided which transmits wake-up signal SWU having a pulse width shorter than the predetermined length of time ΔT to the inside of a device, using the on-operation of operation switch 17 as a trigger. Therefore, in a case where operation switch 17 is fixed in an on-state, it is possible to realize a mechanism capable of stopping a wake-up function after any predetermined length of time ΔT, in other words, a mechanism that performs wake-up only for any length of time.

Figure 3:
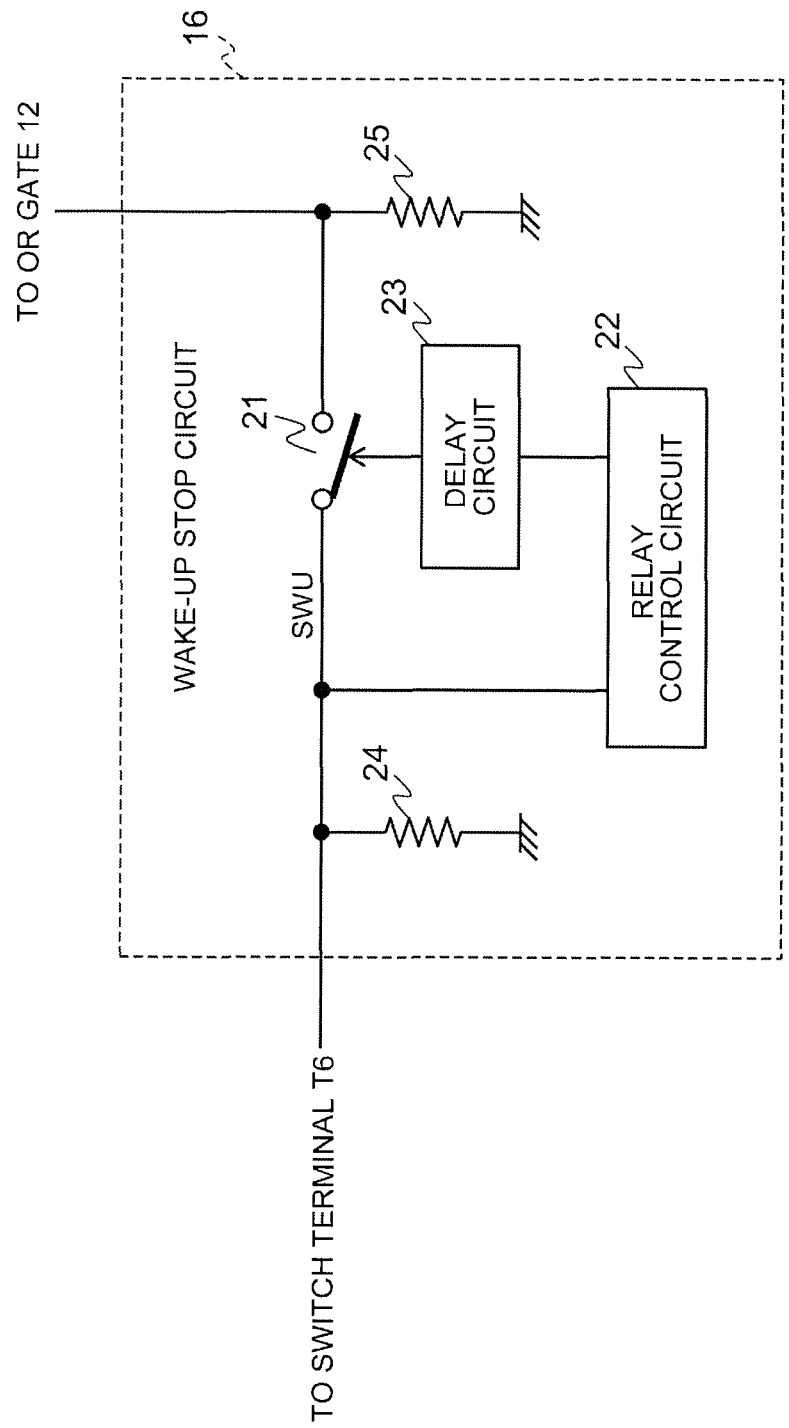
FIG. 3 is a block diagram illustrating a configuration example of the wake-up stop circuit that realizes the operations illustrated in FIGS. 2A to 2C.

FIG. 3 illustrates a configuration example of wake-up stop circuit 16 that realizes operations as illustrated in FIGS. 2A to 2C. Wake-up stop circuit 16 is configured to include a relay circuit 21, a relay control circuit 22, a delay circuit 23, pull-down resistors 24 and 25, and the like. Relay circuit 21 interrupts the transmission of wake-up signal SWU input from operation switch 17 to OR gate 12 (wake-up circuit 13). Relay control circuit 22 detects the on/off operation of operation switch 17, and has a function of giving an instruction to interrupt relay circuit 21 when switch terminal T6 is at a high level, and giving an instruction to turn on relay circuit 21 when the switch terminal is at a low level. Delay circuit 23 delays an output signal of relay control circuit 22 only for the predetermined length of time ΔT.

In this manner, when wake-up signal SWU is at a high level for a time longer than the delay time of delay circuit 23, wake-up signal SWU is prevented from being maintained to be at a high level by interrupting relay circuit 21. Thereby, in a case where on-state fixation has occurred, it is possible to prevent a wake-up state from being maintained due to wake-up signal SWU being supplied to wake-up circuit 13 through OR gate 12. In addition, it is also possible to prevent an ECU having a CAN wake-up function among ECUs 2-2, 2-3, 2-4, . . . from being woken up due to the on-state fixation of operation switch 17.

Figure 4:
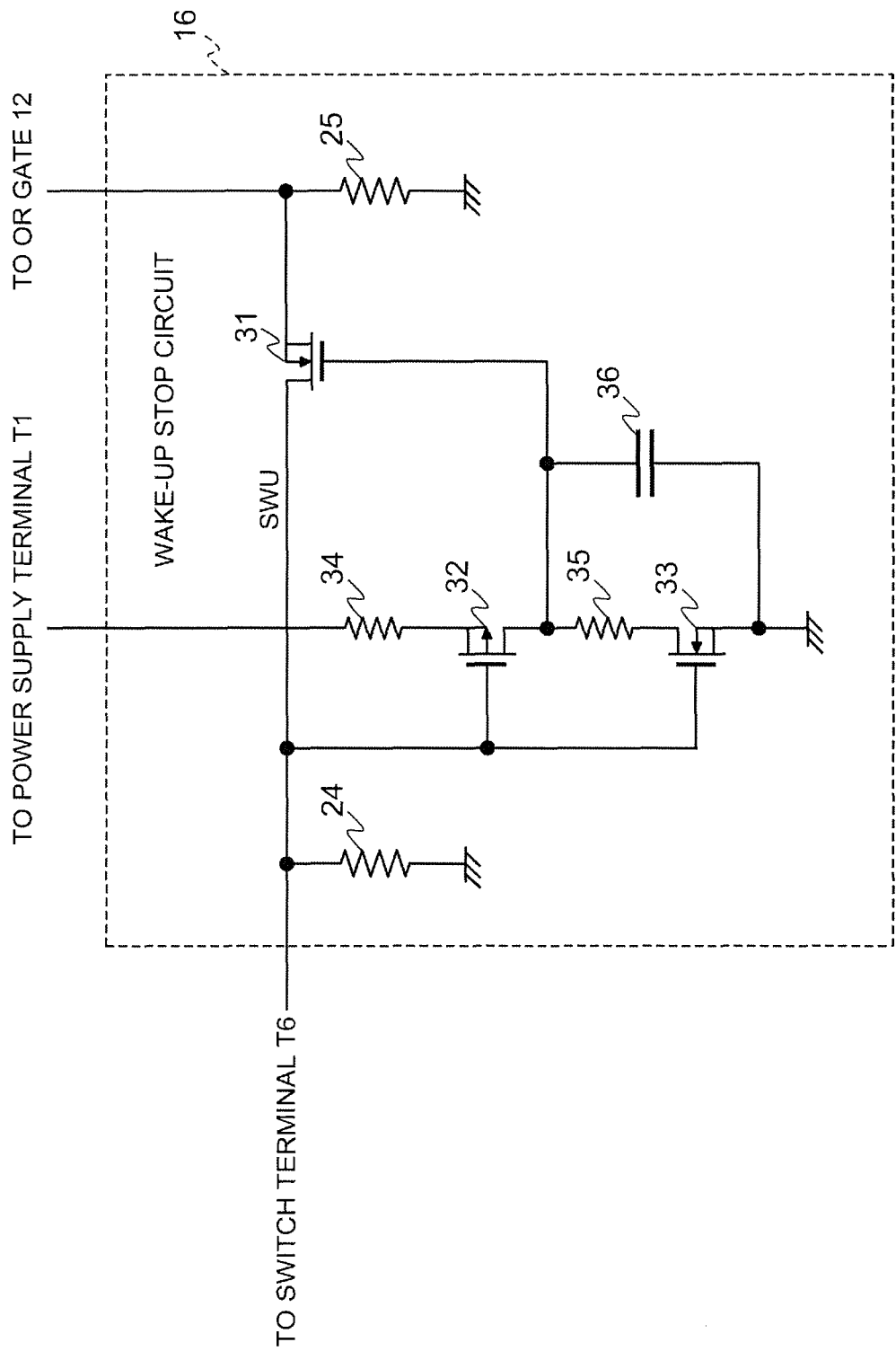
FIG. 4 is a circuit diagram illustrating a specific configuration example of the wake-up stop circuit in the vehicular control device illustrated in FIG. 1.

FIG. 4 illustrates a diagram in which, in wake-up stop circuit 16 illustrated in FIG. 3, relay circuit 21 is formed by a semiconductor relay (N-channel type MOSFET 31), and relay control circuit 22 and delay circuit 23 are formed by a P-channel type MOSFET 32, an N-channel type MOSFET 33, resistors 34 and 35 and a capacitor 36.

The current passage of MOSFET 31 is connected between switch terminal T6 and one input terminal of OR gate 12. Resistor 34, the current passage of MOSFET 32, resistor 35 and the current passage of MOSFET 33 are connected in series to each other between power supply terminal T1 and the ground point, and the gates of MOSFETs 32 and 33 are connected to switch terminal T6. The gate of MOSFET 31 is connected to the connection point between MOSFET 32 and resistor 35, and capacitor 36 is connected between the connection point and the ground point.

MOSFETs 32 and 33 are configured as a CMOS inverter that controls MOSFET 31 on the basis of the on/off operation of switch terminal T6, that is, operation switch 17. Resistor 35 and capacitor 36 are configured to generate a time constant, and to delay the operation of inversion from the output state of a high level of the CMOS inverter to the output state of a low level. Thereby, MOSFET 31 is set to be in an on-state when wake-up signal SWU of switch terminal T6 is at a low level. However, since switch terminal T6 is at a low level, wake-up signal SWU is at a low level. On the other hand, in a case where wake-up signal SWU is set to a high level, signal SWU is transmitted to OR gate 12 through MOSFET 31, and MOSFET 31 is set to be in an off-state after a predetermined length of time ΔT based on the time constants of resistor 35 and capacitor 36 has elapsed. Therefore, OR gate 12 is supplied with pulsed wake-up signal SWU which is at a high level only for the predetermined length of time ΔT.

Figure 5:
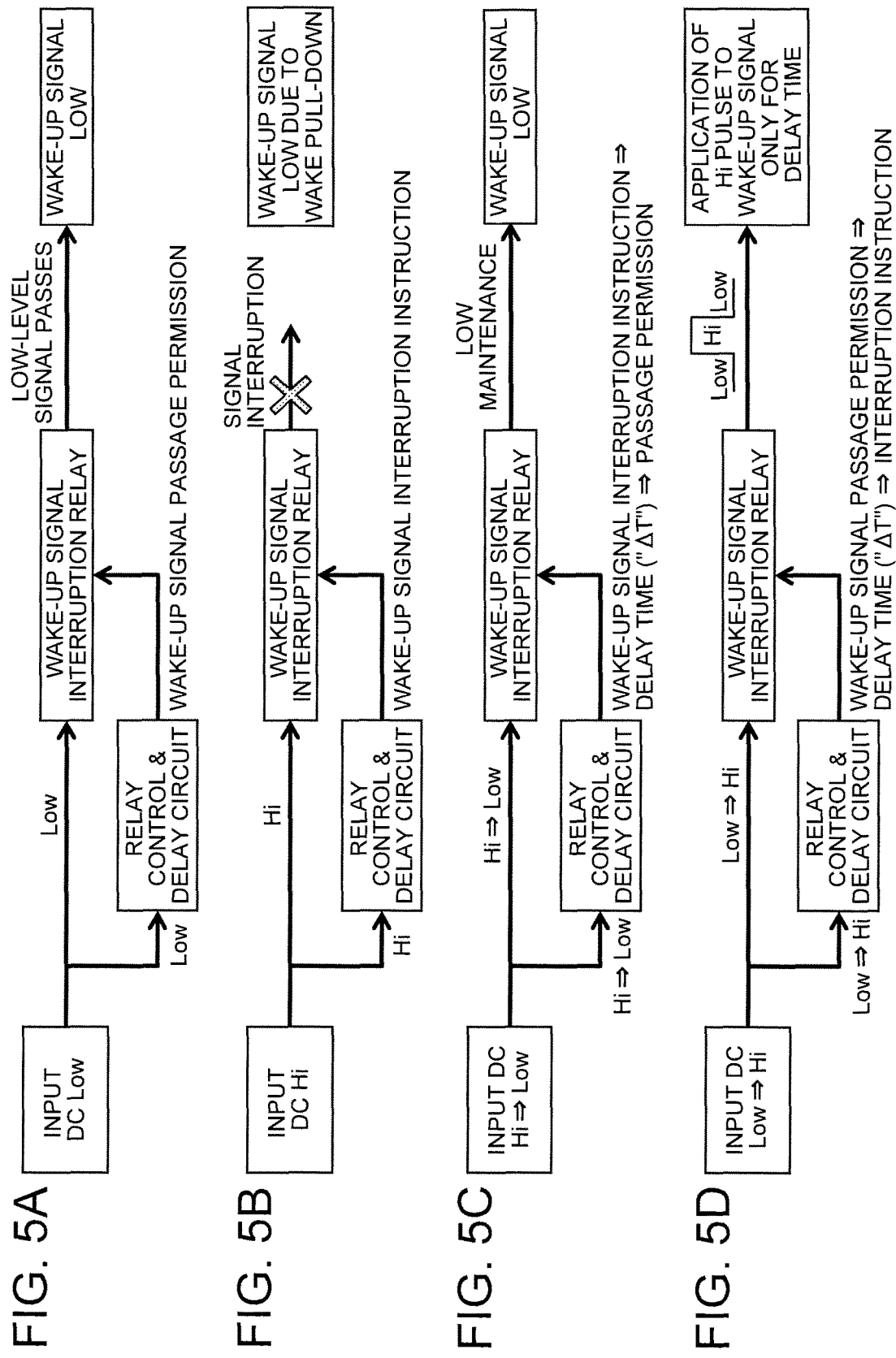
FIGS. 5A to 5D are schematic diagrams illustrating operations of the wake-up stop circuit illustrated in FIG. 4.

FIGS. 5A to 5D particularly illustrates a relationship between the level of wake-up signal SWU (level of switch terminal T6) which is input to wake-up stop circuit 16 illustrated in FIG. 4 and a signal which is input to OR gate 12. FIG. 5A illustrates a case where a direct-current low level (DC_Low) is input from switch terminal T6. In a case where a signal of a low level is input to the relay control and delay circuits (MOSFETs 32 and 33, resistors 34 and 35 and capacitor 36), wake-up signal passage permission is issued to a wake-up signal interruption relay (MOSFET 31). Thereby, a signal of a low level passes through the relay, and wake-up signal SWU of a low level is supplied to OR gate 12.

FIG. 5B illustrates a case where a direct-current high level (DC_Hi) is input from switch terminal T6. In a case where a signal of a high level is input to the relay control and delay circuits, a wake-up signal interruption instruction is issued to the wake-up signal interruption relay. Thereby, the signal is interrupted by the relay, and wake-up signal SWU is set to a low level due to wake pull-down.

FIG. 5C illustrates a case where a signal which is input from switch terminal T6 changes from a direct-current high level (DC_Hi) to a direct-current low level (DC_Low). In a case where a signal changing from a high level to a low level is input to the relay control and delay circuits, a wake-up signal interruption instruction is issued to the wake-up signal interruption relay, and passage permission is issued after a predetermined length of time ΔT has elapsed. Therefore, even in a case where wake-up signal SWU is set to a low level due to a signal being interrupted by the relay, and passage permission is issued after the predetermined length of time ΔT has elapsed, switch terminal T6 is at a low level, and thus wake-up signal SWU is maintained at a low level.

FIG. 5D illustrates a case where a signal which is input from switch terminal T6 changes from a direct-current low level (DC_Low) to a direct-current high level (DC_Hi). In a case where a signal changing from a low level to a high level is input to the relay control and delay circuits, wake-up signal passage permission is issued to the wake-up signal interruption relay, and an interruption instruction is issued after the predetermined length of time ΔT has elapsed. Therefore, wake-up signal SWU is at a high level in a pulse shape only for the predetermined length of time ΔT.

As described above, the relay control and delay circuits are constituted by a CMOS inverter circuit and an RC circuit, and the wake-up signal interruption relay is constituted by an N-channel type MOSFET. Thereby, a relay interruption instruction can be issued in a case where a signal of a high level is input to switch terminal T6, and a relay-on instruction can be issued in a case where a signal of a low level is input to the switch terminal. The relay interruption instruction is issued after the predetermined length of time ΔT has elapsed from relay-on, due to the delay time of the RC circuit.

In the above configuration, when the operation of ECU 2-1 is stopped (in a state where the operation switch is off, and the ignition key is off based on signal IGN), there are only the gate leakage current and off leakage current of each MOSFET as current paths, and thus an increase in dark current can be minimized. Specifically, the dark current is of an approximately nA order.

Meanwhile, in the circuit illustrated in FIG. 4, the interruption relay is changed to a P-channel type MOSFET, and the pull-down resistor is changed to a pull-up resistor, whereby it is possible to make change from a trigger at a rising edge to a trigger at a falling edge. Thereby, the present invention is also applicable to a case where operation switch 17 is not connected to a battery power supply but grounded.

Figure 6:
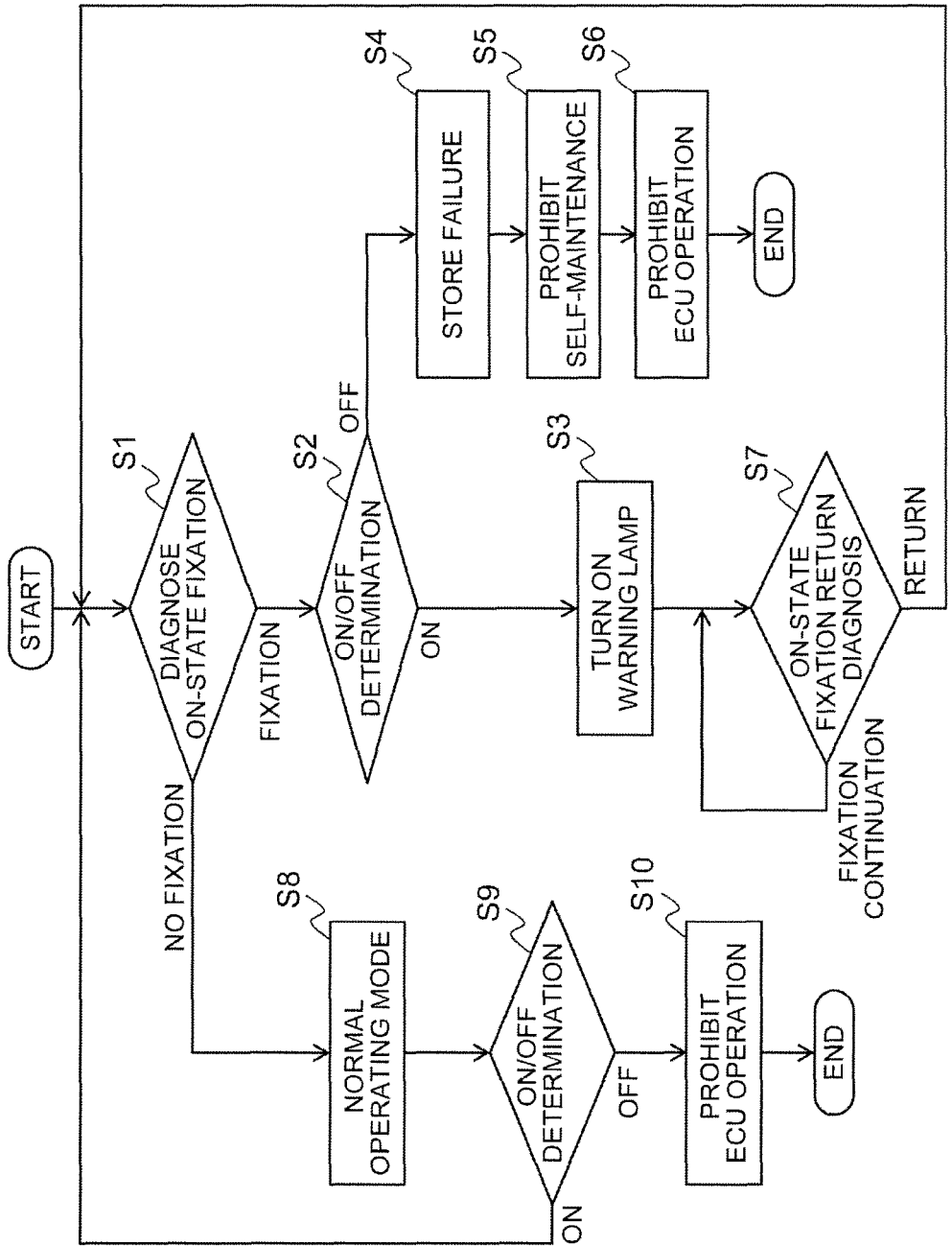
FIG. 6 is a flow diagram illustrating a control method in a case where the operation switch of an electric parking brake is fixed in an on-state, in the vehicular control device illustrated in FIG. 1.

Next, in such a configuration above, a control method in a case where a switch for operating the electric parking brake is fixed in an on-state will be described with reference to the flow diagram of FIG. 6. First, microcomputer 15 diagnoses the presence or absence of on-state fixation of operation switch 17 of electric parking brake 3 (step S1). In the diagnosis of on-state fixation of operation switch 17, microcomputer 15 monitors wake-up signal SWU (level of switch terminal T6) of ECU 2-1 that controls electric parking brake 3, and determines that the operation switch is fixed in an on-state when wake-up signal SWU is kept at a high level for a predetermined length of time. In a case where the operation switch is diagnosed as on-state fixation, the on/off determination of the ignition key is performed (step S2). The on/off determination of the ignition key is performed by microcomputer 15 monitoring signal IGN which is input from IGN terminal T2.

In a case where the ignition key is determined to be on, for example, a warning lamp is turned on in order to draw a driver's attention by notifying the driver of the determination result (step S3). On the other hand, in a case where the ignition key is determined to be off, that is, in a case where operation switch 17 of electric parking brake 3 in ECU 2-1 is fixed in an on-state, and the ignition key is off, failure recording is performed on a storage device (not shown) within ECU 2-1 in order to inform a driver that a failure is present at the time of restart (step S4). Next, self-maintenance is stopped (step S5), and the operation of ECU 2-1 is stopped by putting the ECU (step S6) to sleep. Thereby, an ECU having a CAN wake-up function among ECUs 2-2, 2-3, 2-4, . . . is prevented from being woken up by the on-state fixation of operation switch 17 of electric parking brake 3. Therefore, it is possible to stop the operations of all ECUs 2-1, 2-2, 2-3, 2-4, . . . within a vehicle except an ECU required for an operation even after an engine is stopped, and to reduce a dark current.

In a case where it is determined in step S1 that on-state fixation is not present, a normal operating mode is set (step S8). In the normal operating mode, data can be transmitted and received using a CAN protocol. Next, the on/off determination of the ignition key is performed (step S9). In a case of the on determination, the process proceeds to step S1, and the above-described operation is repeated. In a case of the off determination, the operation of ECU 2-1 is stopped (sleep) by microcomputer 15, and the process is terminated.

According to the configuration as described above, in a case where operation switch 17 of electric parking brake 3 is fixed in an on-state, wake-up stop circuit 16 forcibly interrupts wake-up signal SWU after a predetermined length of time has elapsed from a wake-up instruction, and thus it is possible to put ECU 2-1 to sleep even when operation switch 17 is fixed in an on-state. Therefore, it is possible to reduce a dark current when the ignition is off.

In addition, in the system having a plurality of ECUs 2-2, 2-3, 2-4, . . . , inclusive of ECU 2-1, connected to each other through an in-vehicle network, there is no fear that communication between ECU 2-1 having operation switch 17 fixed in an on-state and ECUs for other electrical components 2-2, 2-3, 2-4, . . . is performed, and the ECUs for other electrical components having a wake-up function are set to be in an operation continuation state, to thereby increase consumption current. Thus, it is also possible to prevent a battery from being exhausted due to the continuous on-state fixation of operation switch 17.

Meanwhile, in the above-described embodiment, a description has been given of the vehicular control device including an ECU that controls an electric parking brake, but the present invention is not limited to the above-described embodiment, and can be carried out through various modifications without departing from the scope of the invention.

Modified Example

For example, the invention can also be applied to a door switch changing over on/off in interlocking with the opening and closing of a door. Even when an interior lamp, a warning buzzer and the like operate in interlocking with the opening and closing of a door, these are forcibly stopped after such an operation is continued for a predetermined length of time, and thus it is possible to prevent a battery from being exhausted even in a case where a driver got down from a car and left the car as it is without noticing the door ajar.

In addition, in a case where there is an ECU or a circuit interlocking with the door switch, its operation may be continued for a predetermined length of time and then forcibly stopped.

REFERENCE SYMBOL LIST 1a, 1b CAN bus
2-1, 2-2, 2-3, 2-4 ECU (control device)
3 Electric parking brake (electrical component)
4 Actuator
11 CAN communication IC
12 OR gate
13 Wake-up circuit
14 Power supply IC
15 Microcomputer (control unit)
16 Wake-up stop circuit
17 Operation switch (external switch)
21 Relay circuit
22 Relay control circuit
23 Delay circuit
SWU Wake-up signal
ΔT Predetermined length of time

The invention claimed is:
1. A vehicular control device comprising:
a control unit that controls an electrical component;
a wake-up circuit that wakes up the control unit on the basis of a wake-up signal from a switch for operating the electrical component; and a wake-up stop circuit that interrupts the wake-up signal supplied from the switch to the wake-up circuit after a predetermined length of time has elapsed from a wake-up instruction,
wherein the control unit
diagnoses whether the switch is fixed in an on-state,
performs an on/off determination of an ignition key when the switch is diagnosed to be fixed in an on-state, and
performs failure recording in a case where the switch is fixed in an on-state, and the ignition key is determined to be off, and stops self-maintenance to put the control unit to sleep so as to stop its operation.

2. The vehicular control device according to claim 1, wherein the wake-up stop circuit includes a trigger circuit that starts clocking using an on-operation of the switch as a trigger, and transmits the wake-up signal for a predetermined length of time from the trigger.

3. The vehicular control device according to claim 2, wherein the trigger circuit includes a relay circuit that interrupts the wake-up signal from the switch to the wake-up circuit, a relay control circuit that detects an on/off operation of the switch to control the relay circuit, and a delay circuit, controlled by the relay control circuit, which turns on the relay circuit until an on-state of the switch is detected and then a predetermined length of time elapses.

4. The vehicular control device according to claim 1, wherein the electrical component is an electric parking brake.

5. The vehicular control device according to claim 1, wherein the control unit includes a microcomputer.

6. The vehicular control device according to claim 5, further comprising a CAN communication integrated circuit (IC), an OR gate, and a power supply IC.

7. The vehicular control device according to claim 6, wherein the CAN communication IC performs data communication with a control device that controls another electrical component through a CAN bus.

8. The vehicular control device according to claim 7, wherein the OR gate receives a CAN wake-up signal output from the CAN communication IC; a signal indicating a state of an ignition key; a wake-up signal interlocked with a state of the switch; and a self-maintenance signal from the microcomputer, and controls the wake-up circuit.

9. The vehicular control device according to claim 8, wherein the wake-up circuit wakes up the microcomputer from a sleep state by supplying power from the power supply IC to the microcomputer, on the basis of an output signal of the OR gate.

10. The vehicular control device according to claim 9, wherein the wake-up circuit includes a semiconductor switch element of which a current passage is connected between a power supply terminal and the power supply IC, and which is controlled on/off on the basis of the output signal of the OR gate.

11. The vehicular control device according to claim 10, wherein the electrical component is an electric parking brake, and
wherein the microcomputer monitors the state of the switch, and sets the electric parking brake to an applied state in a case where the switch gives an instruction to apply the electric parking brake.

12. A method of controlling a vehicular control device including a control unit that controls an electrical component, a wake-up circuit that wakes up the control unit on the basis of a wake-up signal from a switch for operating the electrical component, and a wake-up stop circuit that interrupts the wake-up signal supplied from the switch to the wake-up circuit after a predetermined length of time has elapsed from a wake-up instruction, the method comprising:
diagnosing whether the switch for operating the electrical component in the control unit is fixed in an on-state;
performing an on/off determination of an ignition key when the switch is diagnosed to be fixed in an on-state;
performing failure recording in a case where the ignition key is determined to be off; and
stopping self-maintenance to put the control unit to sleep so as to stop its operation.

13. The method of controlling a vehicular control device according to claim 12, further comprising giving a notice to a driver of a vehicle in a case where the ignition key is determined to be on.

14. The method of controlling a vehicular control device according to claim 13, wherein the giving the notice to the driver of the vehicle is turning on a warning lamp.

15. The method of controlling a vehicular control device according to claim 14, further comprising performing a return diagnosis of whether the switch returns from a state of being fixed in an on-state, after the giving the notice to the driver of the vehicle.

* * * * *